(12) United States Patent
Holmes et al.

(10) Patent No.: US 7,220,203 B2
(45) Date of Patent: May 22, 2007

(54) ELECTRICALLY VARIABLE TRANSMISSION WITH SELECTIVE FIXED RATIO OPERATION

(75) Inventors: Alan G. Holmes, Clarkston, MI (US); Michael R. Schmidt, Carmel, IN (US); Donald Klemen, Carmel, IN (US); James D. Hendrickson, Belleville, MI (US); Henryk Sowul, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 196 days.

(21) Appl. No.: 11/132,064

(22) Filed: May 18, 2005

(65) Prior Publication Data

US 2006/0046886 A1 Mar. 2, 2006

Related U.S. Application Data

(60) Provisional application No. 60/606,359, filed on Sep. 1, 2004.

(51) Int. Cl.
*F16H 3/72* (2006.01)
(52) U.S. Cl. .......................................................... 475/5
(58) Field of Classification Search ............... 180/65.7; 475/5
See application file for complete search history.

(56) References Cited

U.S. PATENT DOCUMENTS

| 5,558,595 | A | 9/1996 | Schmidt et al. | 477/3 |
| 5,931,757 | A | 8/1999 | Schmidt | 475/2 |
| 6,478,705 | B1 | 11/2002 | Holmes et al. | 475/5 |
| 6,527,658 | B2 | 3/2003 | Holmes et al. | 475/5 |
| 2006/0019785 | A1* | 1/2006 | Holmes et al. | 475/5 |
| 2006/0154771 | A1* | 7/2006 | Klemen et al. | 475/5 |
| 2006/0166773 | A1* | 7/2006 | Raghavan et al. | 475/5 |

* cited by examiner

*Primary Examiner*—Dirk Wright
(74) *Attorney, Agent, or Firm*—Christopher DeVries

(57) ABSTRACT

An electrically variable transmission includes: an input member to receive power from an engine; an output member; first and second motor/generators; and first and second differentially geared planetary gear sets each having first, second and third gear members. The input member is continuously connected to the first member of the first planetary gear set, and the output member is continuously connected to the first member of the second planetary gear set. The first motor/generator is continuously connected to the second member of the first planetary gear set, and selectively connected to the second member of the second planetary gear set. The second motor/generator is continuously connected with the third member of the second planetary gear set. Five or six torque transfer devices selectively connect members of the planetary gear sets with each other or with ground. The torque transfer devices are engageable in combinations of two or three to provide five or six available fixed speed ratios.

13 Claims, 5 Drawing Sheets

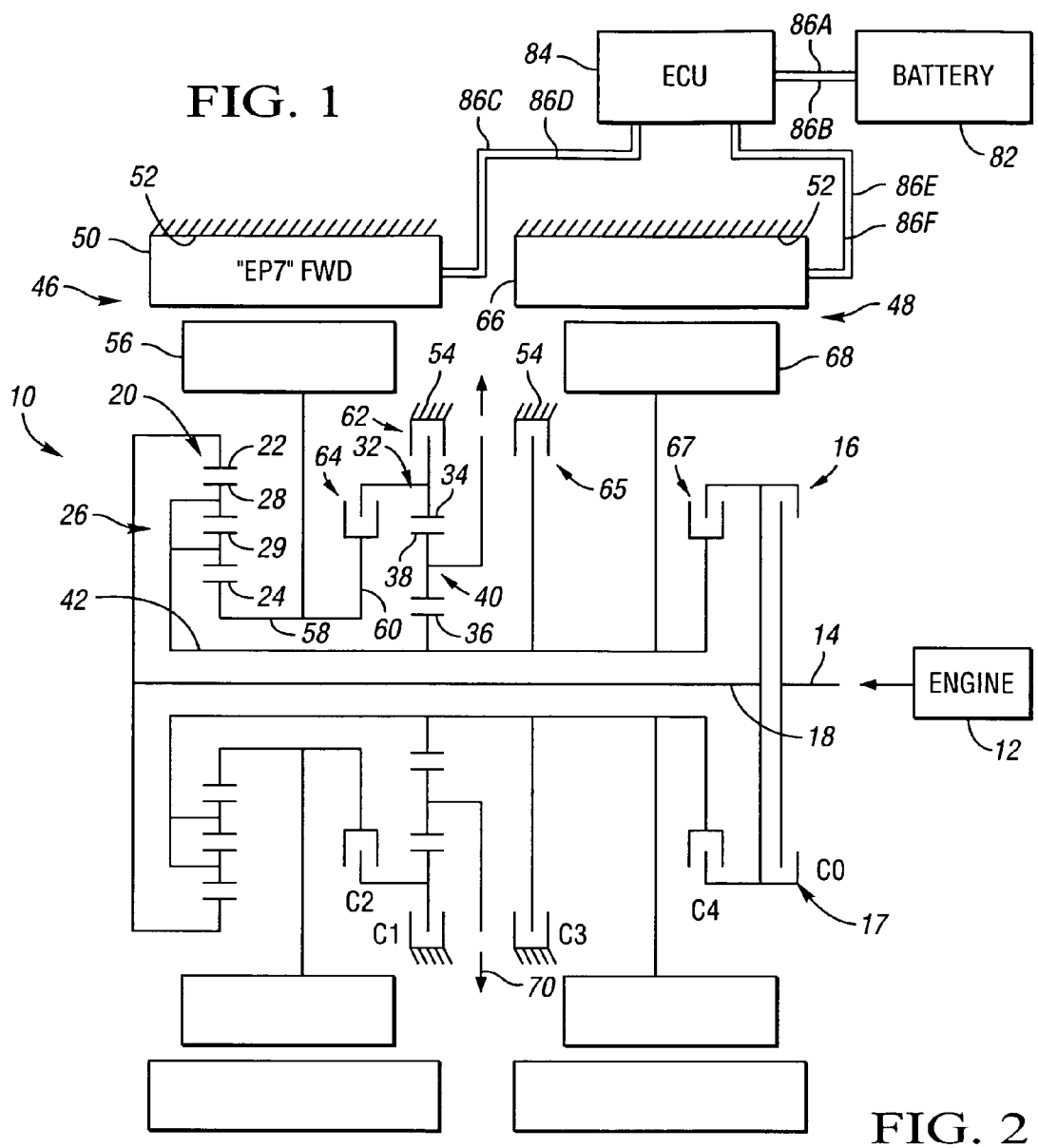

| MODE | (262) C1 | (264) C2 | (265) C3 | (267) C4 | (269) C5 | |
|---|---|---|---|---|---|---|
| E1 | X | | | X | | ELECTRIC ONLY |
| E2 | | X | | X | | ELECTRIC ONLY |
| S1 | X | | X | | | SERIES START-STOP |
| V1 | X | | | | X | INPUT-SPLIT RANGE |
| F1 | X | | | X | X | FIXED GEAR |
| F2 | X | X | | | X | FIXED GEAR |
| F3 | X | | X | X | | FIXED GEAR |
| F4 | | X | | X | X | FIXED GEAR |
| V2 | | X | | | X | COMPOUND-SPLIT RANGE |
| F5 | | X | X | | X | FIXED GEAR |
| V3 | | X | X | | | OUTPUR-SPLIT RANGE |
| F6 | X | X | X | | | FIXED GEAR |

| MODE | (362) C1 | (364) C2 | (365) C3 | (367) C4 | (369) C5 | |
|---|---|---|---|---|---|---|
| S1 | X | | X | | | SERIES |
| V1 | X | | | | X | INPUT-SPLIT RANGE |
| F1 | X | | | X | X | FIXED GEAR |
| F2 | X | X | | | X | FIXED GEAR |
| F3 | | X | | X | X | FIXED GEAR |
| V2 | | X | | | X | COMPOUND-SPLIT RANGE |
| F4 | | X | X | | X | FIXED GEAR |
| V3 | | X | X | | | OUTPUR-SPLIT RANGE |
| F5 | | X | X | X | | FIXED GEAR |

| MODE | (462) C1 | (464) C2 | (465) C3 | (467) C4A | (471) C4B | (469) C5 | |
|---|---|---|---|---|---|---|---|
| S1 | X | | X | | | | SERIES |
| V1 | X | | | | | X | INPUT-SPLIT RANGE |
| F1 | X | | | X | | X | FIXED GEAR |
| F2 | X | X | | | | X | FIXED GEAR |
| F3 | | X | | X | | X | FIXED GEAR |
| V2 | | X | | | | X | COMPOUND-SPLIT RANGE |
| F4 | | X | X | | | X | FIXED GEAR |
| V3 | | X | X | | | | OUTPUR-SPLIT RANGE |
| F5 | | X | X | X | | | FIXED GEAR |
| F6 | | X | X | | X | | FIXED GEAR |

ELECTRICALLY VARIABLE TRANSMISSION WITH SELECTIVE FIXED RATIO OPERATION

CROSS-REFERENCE TO RELATED APPLICATION

This application claims the benefit of U.S. Provisional Application 60/606,359, filed Sep. 1, 2004, which is hereby incorporated by reference in its entirety.

TECHNICAL FIELD

The present invention relates to electrically variable transmissions with selective operation both in power-split variable speed ratio ranges and in up to six fixed speed ratios.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and the emissions of pollutants, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between the engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. A hybrid electrically variable transmission system in a vehicle includes an electrical storage battery, so the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the two-range, input-split and compound-split electrically variable transmission now produced for transit buses. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators.

Operation in first or second variable-speed-ratio modes of operation may be selectively achieved by using clutches in the nature of first and second torque transfer devices. In the first mode, an input-power-split speed ratio range is formed by the application of the first clutch, and the output speed of the transmission is proportional to the speed of one motor/generator. In the second mode, a compound-power-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation of the transmission in a neutral mode may be selectively achieved by releasing both clutches, decoupling the engine and both electric motor/generators from the transmission output.

The two-range, input-split and compound-split electrically variable transmission may be constructed with two sets of planetary gearing or with three sets of planetary gearing. In addition, some embodiments may utilize three torque transfer devices—two to select the operational mode desired of the transmission and the third selectively to disconnect the transmission from the engine. In other embodiments, all three torque transfer devices may be utilized to select the desired operational mode.

U.S. Pat. No. 6,527,658, issued Mar. 4, 2003 to Holmes et al and commonly assigned with the present application, discloses an electrically variable transmission utilizing two planetary gear sets, two motor/generators and two clutches to provide input split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, selectively providing an input-power-split speed ratio range and a compound-power-split speed ratio range. One fixed speed ratio can also be selectively achieved.

SUMMARY OF THE INVENTION

The present invention improves upon the above-referenced prior art transmissions by providing additional clutches to enhance operation of the transmission, to allow additional fixed speed ratios and to allow an additional compound-power-split speed ratio range. An object of the invention is to provide the best possible energy efficiency and emissions for a given engine. In addition, optimal performance, capacity, package size, and ratio coverage for the transmission are sought.

A fixed speed ratio is an operating condition in which the mechanical power input to the transmission is transmitted mechanically to output, and no power flow is necessary through the motor/generators. An electrically variable transmission that may selectively achieve several fixed speed ratios for operation near full engine power can be smaller and lighter for a given maximum capacity. Fixed ratio operation may also result in lower fuel consumption when operating under conditions where engine speed can approach its optimum without using the motor/generators.

In comparison to prior art electrically variable transmissions with only one clutch for each of two speed ranges (C1 and C2), this invention reduces power flow through the electrical path, reducing electrical component costs and power losses. By providing a third clutch (C3), one of the motors can thereby be locked to the transmission case to provide, along with the application of C2, an additional fixed speed ratio to allow high speed cruising with improved transmission efficiency.

A fourth clutch (C4) may be provided as a "lock-up clutch" or "direct-drive clutch" to lock the elements of one of the planetary gear sets together. This clutch allows the transmission to transmit torque and power at two additional fixed speed ratios: a low ratio with C1 and C4 engaged and speed reduction through the other planetary gear set; and a direct drive ratio with C2 and C4 engaged. The action of the C4 clutch allows more torque and power to be transmitted by the transmission in these fixed ratios than at similar ratios by action of the motor/generators and C1 or C2 clutch alone. The C4 clutch enables maximum power to be achieved for passing or towing and hauling heavy loads in a truck or similar vehicle. The C4 enables the use of smaller electrical components with high-power engines, a combination which may be practical for personal trucks.

An extra fourth clutch (C4B) may be added to provide six fixed ratios.

Additionally, a fifth clutch (C5) may be added to decouple the mechanical path from the engine to the output, and to allow the electrical path to be engaged alone. Sudden and unpredicted changes in input speed, such as from starting and stopping the engine, can then be made without disturbing the output. The C5 clutch enables one motor/generator to drive the vehicle forward or in reverse while decoupled from the other motor/generator and the engine. When using the engine to drive the vehicle in reverse in the input-split range, an adverse torque reaction occurs, so the release of the C5 clutch improves the continuous reverse grade ability of the vehicle.

One aspect of the present invention provides a new and novel electrically variable transmission, as above, that is significantly less complex than prior known electrically variable transmissions.

It is a further aspect of the present invention to provide a new and novel electrically variable transmission, as above, that can be manufactured at a significant cost reduction relative to prior known electrically variable transmissions. The present invention may achieve this through the use of additional clutches to provide up to six fixed speed ratios and therefore allow smaller electrical components, and the use of only two planetary gear sets, the minimum for a compound power split.

These and other aspects of the invention, as well as the advantages thereof over existing and prior art forms, which will be apparent in view of the following detailed specification, are accomplished by means hereinafter described and claimed.

By way of a general introductory description, an electrically variable transmission embodying the concepts of the present invention has an input member to receive power from an engine and an output member to deliver power to the drive members that propel the vehicle. There are first and second motor/generators as well as first and second planetary gear sets. Each planetary gear set has an inner gear member and an outer gear member that meshingly engage a plurality of planet gear members rotatably mounted on a carrier. The input member is continuously connected to one member of the first planetary gear set, and the output member is continuously connected to one member of the second planetary gear set. One motor/generator is continuously connected to another member in the first planetary gear set as well as being selectively connected to a member of the second planetary gear set. The second motor/generator is continuously connected to the remaining member of the second planetary gear set, and is continuously connected to the remaining member of the first planetary gear set. Alternately, the second motor/generator may be selectively connected to the remaining member of the first planetary gear set.

A first torque transfer device (C1) selectively grounds one member of the second planetary gear set, and a second torque transfer device (C2) selectively connects this same member of the second planetary gear set to the inner gear member of the first planetary gear set as well as to the rotor of one motor/generator.

An optional third torque transfer device (C3) selectively connects said remaining members of the first and second planetary gear sets and the second motor/generator to ground. Alternatively, the optional third torque transfer device (C3) may selectively connect said remaining member of the first planetary gear set to ground.

An optional fourth torque transfer device (C4) selectively connects at least two members of the transmission together such that the members of the first planetary gear set rotate together at the same speed. The optional fourth torque transfer device (C4) may selectively connect a member of the first planetary gear subset to another member of the first planetary gear subset. Alternatively, the optional fourth torque transfer device (C4) may selectively connect said remaining members of the first and second planetary gear sets and the second motor/generator to the member of the first planetary gear set that is connected with the input member. In one embodiment, both of the above-mentioned fourth torque transfer devices are implemented (C4A and C4B).

An optional fifth torque transfer device (C5) selectively disconnects said remaining member of the first planetary gear set from both the remaining member of the second planetary gear set and the second electric motor/generator. Accordingly, the remaining member of the first planetary gear set may be selectively or continuously connected to both the remaining member of the second planetary gear set and the second electric motor/generator, depending on whether the C5 clutch is present or not.

Another aspect of the invention provides an electrically variable transmission including: an input member to receive power from an engine; an output member; first and second motor/generators; and first and second differentially geared planetary gear sets each having first, second and third gear members. The input member is continuously connected to the first member of the first planetary gear set, and the output member is continuously connected to the first member of the second planetary gear set. The first motor/generator is continuously connected to the second member of the first planetary gear set, and selectively connected to the second member of the second planetary gear set. The second motor/generator is continuously connected with the third member of the second planetary gear set. A first torque transfer device selectively grounds the second member of the second planetary gear set. A second torque transfer device selectively connects the second member of the second planetary gear set to the second member of the first planetary gear set. A third torque transfer device selectively grounds the third member of the first planetary gear set. A fourth torque transfer device selectively connects the first or second member of the first planetary gear set with the third member of the second planetary gear set. A fifth torque transfer device selectively connects the third member of the first planetary gear set with the third member of the second planetary gear set. The torque transfer devices are engageable in combinations of two or three to provide five or six available fixed speed ratios.

The first, second and third members of the planetary gear sets may comprise a ring gear, sun gear, and carrier, in any order. Preferably, the first, second and third members of the first planetary gear set comprise a ring gear, sun gear and carrier, respectively, and the first, second and third members of the second planetary gear set comprise a carrier, ring gear and sun gear respectively.

The torque transfer devices are selectively engaged to provide, sequentially, an input-split mode, a compound-split mode, and an output-split mode, as output speed of the transmission increases. This sequence is most desirable because it minimizes power loops.

Each power split mode has a ratio range of power-feed-forward operation and one or more ratio ranges of power-loop operation. In power-feed-forward operation, which is desired, the power in the electric motor/generators flows in the direction from input to output in parallel with the power flow through the gearing from input to output. In power-loop operation, which is undesirable, the power in the electric motor/generators flows in the direction from output to input, such that a power loop is formed and the power flow through the gearing is greater than the input power or the output power.

An input-split range of speed ratios is most useful for low output speeds, relative to the input speed, because the input-split range has power-feed-forward operation from zero output speed up to some ratio, then power-loop operation at higher output speeds. An output-split range of operation is most useful for high output speeds, relative to the input speed, because the output-split range has power-loop operation below some ratio, then power-feed-forward operation at higher output speeds.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic stick diagram representing an electrically variable transmission implemented in a front wheel drive transmission, wherein four torque transfer devices are implemented to provide four fixed ratios;

FIG. 2 is a chart illustrating clutching engagements and motor/generator operation for different operating conditions of the transmission of FIG. 1;

FIG. 6 is a schematic stick diagram representing another embodiment of the invention, providing another three-range input-compound-output split electrically variable transmission with five fixed speed ratios;

DESCRIPTION OF THE PREFERRED EMBODIMENTS

Figure 3:
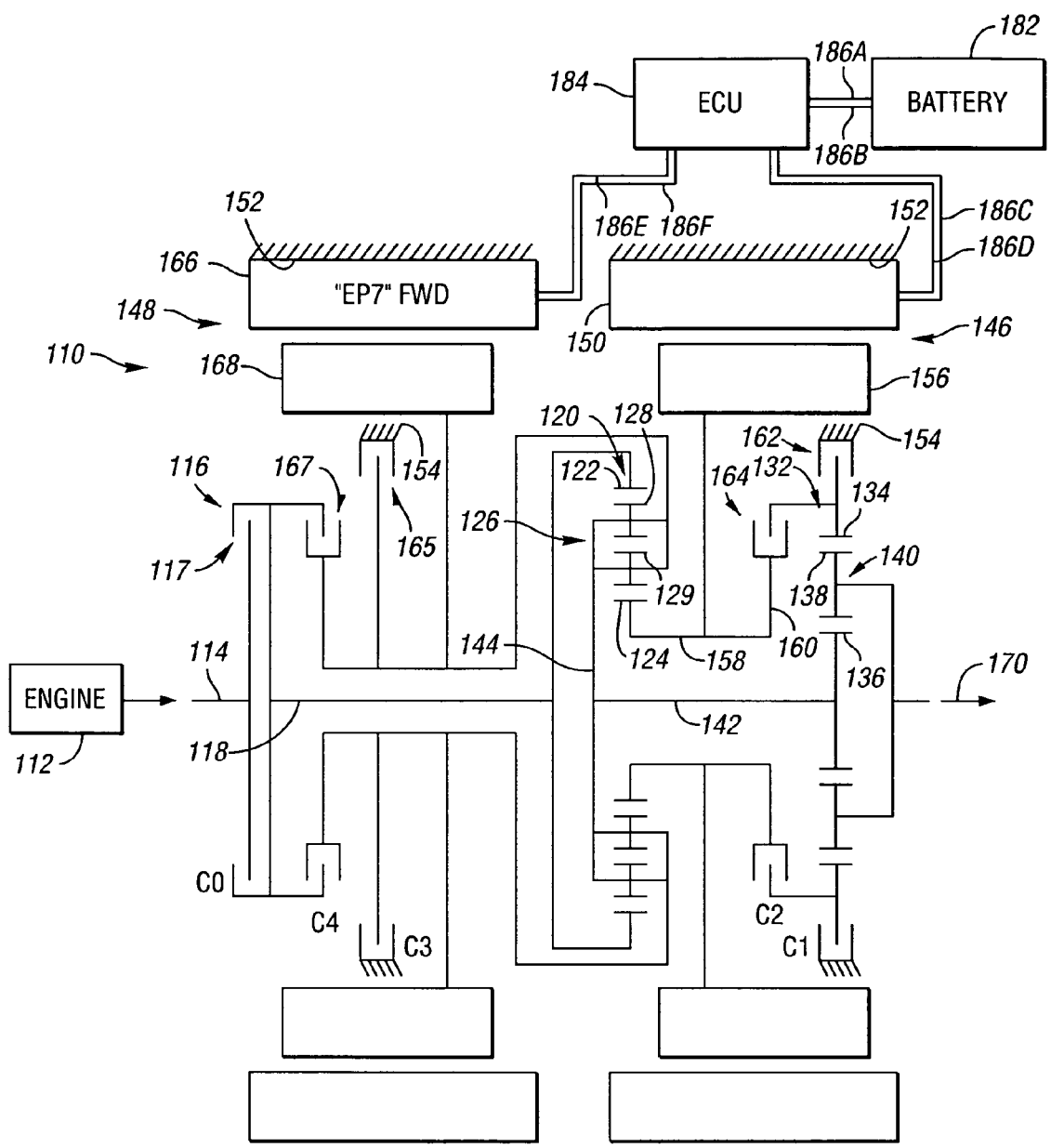
FIG. 3 is a schematic stick diagram representing another form of an electrically variable transmission in a rear wheel drive transmission, wherein four torque transfer devices are implemented to provide four fixed ratios.

U.S. Pat. No. 6,527,658, issued Mar. 4, 2003 to Holmes et al and hereby incorporated by reference in its entirety, discloses an electrically variable transmission utilizing two planetary gear sets, two motor/generators and two clutches to provide input split, compound split, neutral and reverse modes of operation. The present invention provides a relatively similar structure with three or four additional clutches to potentially improve performance.

Description of Related EVT Configurations Having 4 Fixed Ratios

With particular reference, initially, to FIG. 1, an electrically variable transmission is designated generally by the numeral 10. The transmission 10 is designed to receive at least a portion of its driving power from an engine 12. As shown, the engine 12 has an output shaft 14 that may also serve as the forward input member of a transient torque damper 16, which includes an input clutch 17. Transient torque dampers are well known in this art, but irrespective of the particular transient torque damper 16 employed, the output member thereof serves as the input member 18 of the transmission 10, as will be hereinafter more fully described.

In the embodiment depicted the engine 12 may be a fossil fuel engine, such as a diesel engine which is readily adapted to provide its available power output typically delivered at a constant number of revolutions per minute (RPM).

Irrespective of the means by which the engine 12 is connected to the transmission input member 18, the transmission input member 18 is operatively connected to a planetary gear set 20 in the transmission 10.

The transmission 10 utilizes two differential gear sets, preferably in the nature of planetary gear sets. The first planetary gear set 20 employs an outer gear member 22, typically designated as the ring gear. The ring gear 22 circumscribes an inner gear member 24, typically designated as the sun gear. A carrier 26 rotatably supports a plurality of planet gears 28, 29 such that each planet gear 28 meshingly engages the outer, ring gear member 22 and each planet gear 29 meshingly engages the inner, sun gear member 24 of the first planetary gear set 20. The input member 18 is secured to the ring gear member 22 of the first planetary gear set 20.

The second planetary gear set 32 also has an outer gear member 34, often also designated as the ring gear, that circumscribes an inner gear member 36, also often designated as the sun gear. A plurality of planet gears 38 are also rotatably mounted in a carrier 40 such that each planet gear member 38 simultaneously, and meshingly, engages both the outer, ring gear member 34 and the inner, sun gear member 36 of the second planetary gear set 32.

The planetary gear set 20 is compound, and the planetary gear set 32 is simple. The inner, sun gear 36 of the second planetary gear set 32 is conjoined, as through a central shaft 42, to the carrier 26 of the first planetary gear set 20.

The first preferred embodiment 10 also incorporates first and second motor/generators 46 and 48, respectively. The stator 50 of the first motor/generator 46 is secured to the generally annular, interior surface 52 of the transmission housing 54. The rotor 56 of the first motor/generator 46 is secured to a sleeve shaft 58. The inner, sun gear 24 of the first planetary gear set 20 secured to the forward end of the sleeve shaft 58, and the opposite end of the sleeve shaft 58 terminates in a radially extending flange plate 60 which constitutes an interface with a clutch means, which is hereinafter described.

The stator 66 of the second motor/generator 48 is also secured to the generally annular, interior surface 52 of the transmission housing 54. The rotor 68 of the second motor/generator 48 is secured to the central shaft 42, and as such the first and second planetary gear sets 20 and 32 are further compounded.

The two planetary gear sets 20 and 32 as well as the two motor/generators 46 and 48 may be coaxially oriented, as about the axially disposed central shaft 42. This configuration assures that the overall envelope—i.e., the circumferential dimension—of the transmission 10 may be minimized.

The ring gear 34 of the second planetary gear set 32 is selectively grounded to the housing 54, as by a first clutch means in the nature of a torque transfer device 62 (C1). That is, the grounded ring gear 34 is selectively secured against rotation by an operative connection to the non-rotatable housing 54. The ring gear 34 of the second planetary gear set 32 is also selectively connected to the radially extending flange plate 60, as by a second clutch means in the nature of a torque transfer device 64 (C2). The first and second torque transfer devices 62 and 64 are employed to assist in the selection of the operational modes of the hybrid transmission 10, as will be hereinafter more fully explained.

A third torque transfer device 65 (C3) selectively connects the carrier 26, sun gear 36 and rotor 68 to the transmission housing 54. Accordingly, this torque-transfer device allows the second motor/generator 48 to be locked to the transmission housing which provides an additional available fixed ratio when the torque transfer device 64 (C2) is also engaged.

A fourth torque transfer device 67 (C4) is provided as a "lock-up" clutch to lock the ring gear member 22 to the carrier 26. This torque transfer device allows the transmission to transmit torque and power at two additional fixed speed ratios: a low ratio with torque transfer devices 62 (C1) and 67 (C4) engaged, and a direct drive ratio with torque transfer devices 64 (C2) and 67 (C4) engaged. This allows more torque and power to be transmitted by the transmission in these fixed ratios than at similar ratios by action of the C1 or C2 clutches and motor/generators alone. The lock-up clutch enables maximum power to be achieved quickly for passing, towing and hauling in a personal truck or the like, while providing four available fixed ratios and operating with at least one mechanical point in the first mode and at least two mechanical points in the second mode—i.e., three mechanical points, one at each of three separate vehicle speeds.

The output drive member 70 of the transmission 10 is secured to the carrier 40 of the second planetary gear set 32. The output drive member 70 may present peripheral gear teeth (not shown) meshingly to engage a gear (not shown) presented from a transfer case (not shown) that may function as a differential to two corresponding drive shafts. Preferably, this configuration is used in a front wheel drive vehicle. It should also be appreciated that the output drive member

70 could transfer output power to the transfer case by a chain drive or other, similar mechanical connection.

Returning now to the description of the power sources, it should be apparent from the foregoing description, and with particular reference to FIG. 1, that the transmission 10 selectively receives power from the engine 12. As will now be explained, the hybrid transmission also receives power from an electric power source 82. The electric power source 82 may be one or more batteries. Other electric power sources, such as fuel cells, that have the ability to provide, or store, and dispense electric power may be used in place of batteries without altering the concepts of the present invention. As was explained in conjunction with the description of the engine 12 and the motor/generators 46 and 48, it must be similarly understood that the horsepower output of the electrical power source is also not critical to the invention.

The electric power source 82 communicates with an electrical control unit (ECU) 84 by electrical transfer conductors 86A and 86B. The ECU 84 communicates with the first motor/generator 46 by electrical transfer conductors 86C and 86D, and the ECU 84 similarly communicates with the second motor/generator 48 by electrical transfer conductors 86E and 86F.

As apparent from the previous paragraph, a particular structural member, component or arrangement may be employed at more than one location. When referring generally to that type of structural member, component or arrangement, a common numerical designation is employed. However, when one of the structural members, components or arrangements so identified is to be individually identified, it will be referenced by virtue of a letter suffix employed in combination with the numerical designation employed for general identification of that structural member, component or arrangement. Thus, there are six electrical transfer conductors that are generally identified by the numeral 86, but the specific, individual, electrical transfer conductors are, therefore, identified as 86A, 86B, 86C, 86D, 86E and 86F in the specification and on the drawings. This same suffix convention shall be employed throughout the specification.

General Operating Considerations

One of the primary control devices is a well known drive range selector (not shown) that directs a conventional electronic control unit (the ECU 84) to configure the transmission for either the park, reverse, neutral, or forward drive range. The second and third primary control devices constitute an accelerator pedal (not shown) and a brake pedal (also not shown). The information obtained by the ECU from these three primary control sources is designated as the "operator demand." The ECU also obtains information from a plurality of sensors (input as well as output) as to the status of: the torque transfer devices (either applied or released); the engine output torque; the unified battery, or batteries, capacity level; and, the temperatures of selected vehicular components. The ECU determines what is required and then manipulates the selectively operated components of, or associated with, the transmission appropriately to respond to the operator demand.

Both simple and compound planetary gear sets are used. In a simple planetary gear set a single set of planet gears are normally supported for rotation on a carrier that is itself rotatable.

In a simple planetary gear set, when the sun gear is held stationary and power is applied to the ring gear of a simple planetary gear set, the planet gears rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be accurately determined by knowing the number of teeth present on all the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

In a simple set of planetary gears, if any two rotational speeds of the sun gear, the planet carrier, and the ring gear are known, then the speed of the third member can be determined using a simple rule. The rotational speed of the carrier is always proportional to the speeds of the sun and the ring, weighted by their respective numbers of teeth. For example, a ring gear may have twice as many teeth as the sun gear in the same set. The speed of the carrier is then the sum of two-thirds the speed of the ring gear and one-third the speed of the sun gear. If one of these three members rotates in an opposite direction, the arithmetic sign is negative for the speed of that member in mathematical calculations.

The torque on the sun gear, the carrier, and the ring gear can also be simply related to one another if this is done without consideration of the masses of the gears, the acceleration of the gears, or friction within the gear set, all of which have a relatively minor influence in a well-designed transmission. The torque applied to the sun gear of a simple planetary gear set must balance the torque applied to the ring gear, in proportion to the number of teeth on each of these gears. For example, the torque applied to a ring gear with twice as many teeth as the sun gear in that set must be twice that applied to the sun gear, and must be applied in the same direction. The torque applied to the carrier must be equal in magnitude and opposite in direction to the sum of the torque on the sun gear and the torque on the ring gear.

In a compound planetary gear set, the utilization of inner and outer sets of planet gears effects an exchange in the roles of the ring gear and the planet carrier in comparison to a simple planetary gear set. For instance, if the sun gear is held stationary, the planet carrier will rotate in the same direction as the ring gear, but the planet carrier with inner and outer sets of planet gears will travel faster than the ring gear, rather than slower.

In a compound planetary gear set having meshing inner and outer sets of planet gears the speed of the ring gear is proportional to the speeds of the sun gear and the planet carrier, weighted by the number of teeth on the sun gear and the number of teeth filled by the planet gears, respectively. For example, the difference between the ring and the sun filled by the planet gears might be twice as many teeth as are on the sun gear in the same set. In that situation the speed of the ring gear would be the sum of two-thirds the speed of the carrier and one third the speed of the sun. If the sun gear or the planet carrier rotates in an opposite direction, the arithmetic sign is negative for that speed in mathematical calculations.

If the sun gear were to be held stationary, then a carrier with inner and outer sets of planet gears will turn in the same direction as the rotating ring gear of that set. On the other hand, if the sun gear were to be held stationary and the carrier were to be driven, then planet gears in the inner set that engage the sun gear roll, or "walk," along the sun gear, turning in the same direction that the carrier is rotating. Pinion gears in the outer set that mesh with pinion gears in the inner set will turn in the opposite direction, thus forcing a meshing ring gear in the opposite direction, but only with respect to the planet gears with which the ring gear is meshingly engaged. The planet gears in the outer set are being carried along in the direction of the carrier. The effect of the rotation of the pinion gears in the outer set on their own axis and the greater effect of the orbital motion of the planet gears in the outer set due to the motion of the carrier are combined, so the ring rotates in the same direction as the carrier, but not as fast as the carrier.

If the carrier in such a compound planetary gear set were to be held stationary and the sun gear were to be rotated, then the ring gear will rotate with less speed and in the same direction as the sun gear. If the ring gear of a simple planetary gear set is held stationary and the sun gear is rotated, then the carrier supporting a single set of planet gears will rotate with less speed and in the same direction as the sun gear. Thus, one can readily observe the exchange in roles between the carrier and the ring gear that is caused by the use of inner and outer sets of planet gears which mesh with one another, in comparison with the usage of a single set of planet gears in a simple planetary gear set.

The normal action of an electrically variable transmission is to transmit mechanical power from the input to the output. As part of this transmission action, one of its two motor/generators acts as a generator of electrical power. The other motor/generator acts as a motor and uses that electrical power. As the speed of the output increases from zero to a high speed, the two motor/generators gradually exchange roles as generator and motor, and may do so more than once. These exchanges take place around mechanical points, where essentially all of the power from input to output is transmitted mechanically and no substantial power is transmitted electrically.

In a hybrid electrically variable transmission system, an electric storage battery may also supply power to the transmission or the transmission may supply power to the battery. If the battery is supplying substantial electric power to the transmission, such as for vehicle acceleration, then both motor/generators may act as motors. If the transmission is supplying electric power to the battery, such as for regenerative braking, both motor/generators may act as generators. Very near the mechanical points of operation, both motor/generators may also act as generators with small electrical power outputs, because of the electrical losses in the system.

Contrary to the normal action of the transmission, the transmission may actually be used to transmit mechanical power from the output to the input. This may be done in a vehicle to supplement the vehicle brakes and to enhance or to supplement regenerative braking of the vehicle, especially on long downward grades. If the power flow through the transmission is reversed in this way, the roles of the motor/generators will then be reversed from those in normal action.

Operation of FIG. 1 EVT

FIG. 2 is a chart illustrating clutching engagements for the torque transfer devices 62, 64, 65 and 67, and motor/generator operation for the motor/generators 46, 48 under different operating conditions of the transmission 10 shown in FIG. 1.

In Mode 1 Reverse, the torque transfer device 62 is engaged and the engine 12 may hold the ring gear member 22 (in electric only drive), and the second motor/generator 48 drives sun gear member 36, which rotates the carrier 40 to drive the output 70, while the first motor/generator 46 is driven via the sun gear member 24 and carrier 26 with the sun gear held stationary by the engine 12. Accordingly, the motor/generator 48 drives in a reverse direction, and the motor/generator 46 is driven. The engine 12 may or may not be running in reverse.

Accordingly, as described above, if the vehicle operator selects reverse operation, the torque transfer device 62 is engaged to ground the outer ring gear 34 of the second planetary gear set 32 to the housing 54. In further response to operator demand, the ECU 84 reverses the polarity of the electrical power being fed to the stator 66 of the second motor/generator 48. The resultant rotation of the rotor 68 in motor/generator 48 then reverses from the rotational direction associated with forward propulsion in the first, or input split, mode of operation. Under these conditions the inner, sun gear 36 of the second planetary gear set 32 drives the carrier 40 in planetary set 32 against the grounded outer, ring gear 34 to effect retro-rotation of the carrier 40 and the output drive member 70 relative to the rotation of those members during forward propulsion. Operation in the reverse mode is thus achieved.

In Mode 1 Forward, the same conditions apply as in Mode 1 Reverse described above, except the motor/generator is electrically actuated in an opposite rotational direction than in Mode 1 Reverse.

In Gear 1, the first fixed ratio is achieved by engaging the torque transfer devices 62 and 67 while no power is transmitted through the motor/generators 46, 48.

In electrically variable Mode 1, the torque transfer device 62 is engaged and an input split mode is achieved because power enters the first planetary gear set at the ring gear member 22, and is split between a mechanical path to the output 70 via carrier 26, sun gear member 36 and carrier 40, and an electrical path via sun gear 24, motor/generator 46, motor/generator 48, sun gear member 36 and carrier 40. Motor/generator 46 is driven by sun gear member 24, and motor/generator 46 assists motor/generator 48 which is in drive mode (i.e., it acts as a motor). As such, the transmission 10 uses the ring gear 22 of the first planetary gear set 20 to receive power provided by the engine 12 and carrier 26 of that same planetary gear set to provide power to the central shaft 42 by motor/generator 48 operating as a motor. Simultaneously, the transmission 10 uses the second planetary gear set 32 to multiply the torque received through the sun gear 36 of the second planetary gear set 32 and applied to the carrier 40 against the reaction imposed by the grounded ring gear 34 to be delivered to output drive member 70.

In electrically variable Mode 2, only torque transfer device 64 is engaged, and compound split operation is achieved. The motor/generator 46 is in drive mode, and the motor/generator 48 is driven. In the compound split mode the transmission uses the same two planetary gear sets 20 and 32 to provide gearing among the input member 18, both motor/generators 46 and 48 and the output drive member 70 so that power flow is split into mechanical and electrical paths at both the input and the output of the transmission.

In Gear 2, the second fixed ratio is achieved by engaging torque transfer devices 62 and 64 while no power is transmitted through the motor/generators 46, 48.

In Gear 3, the third fixed ratio is achieved, which is a 1:1 direct drive ratio, by engaging torque transfer devices 64 and 67 while no power is transmitted through the motor/generators 46, 48.

In Gear 4, the fourth fixed ratio is achieved by engaging torque transfer devices 64 and 65 while no power is transmitted through the motor/generators 46, 48.

There is also a neutral mode, wherein the input member 18 from the engine 12 and the two motor/generators 46 and 48 are effectively disconnected from the output drive member 70 by allowing one member of the second planetary gear set 32 to spin freely. That is, both torque transfer devices 62 and 64 are disengaged, thus allowing the outer gear member 34 of the second planetary gear set 32 to spin freely and thereby effect the neutral mode.

Description of FIG. 3 EVT

With particular reference to FIG. 3, another related electrically variable transmission is identified generally by the designation 110. The operating components of FIG. 3 are substantially similar to those of FIG. 1, so like reference numerals are used to refer to like components from FIGS. 1 and 3. In FIG. 3, the transmission of FIG. 1 has been rearranged in a rear wheel drive layout. It includes four torque transfer devices, as in FIG. 1, and operates in accordance with the chart of FIG. 2.

Figures 4, 5:
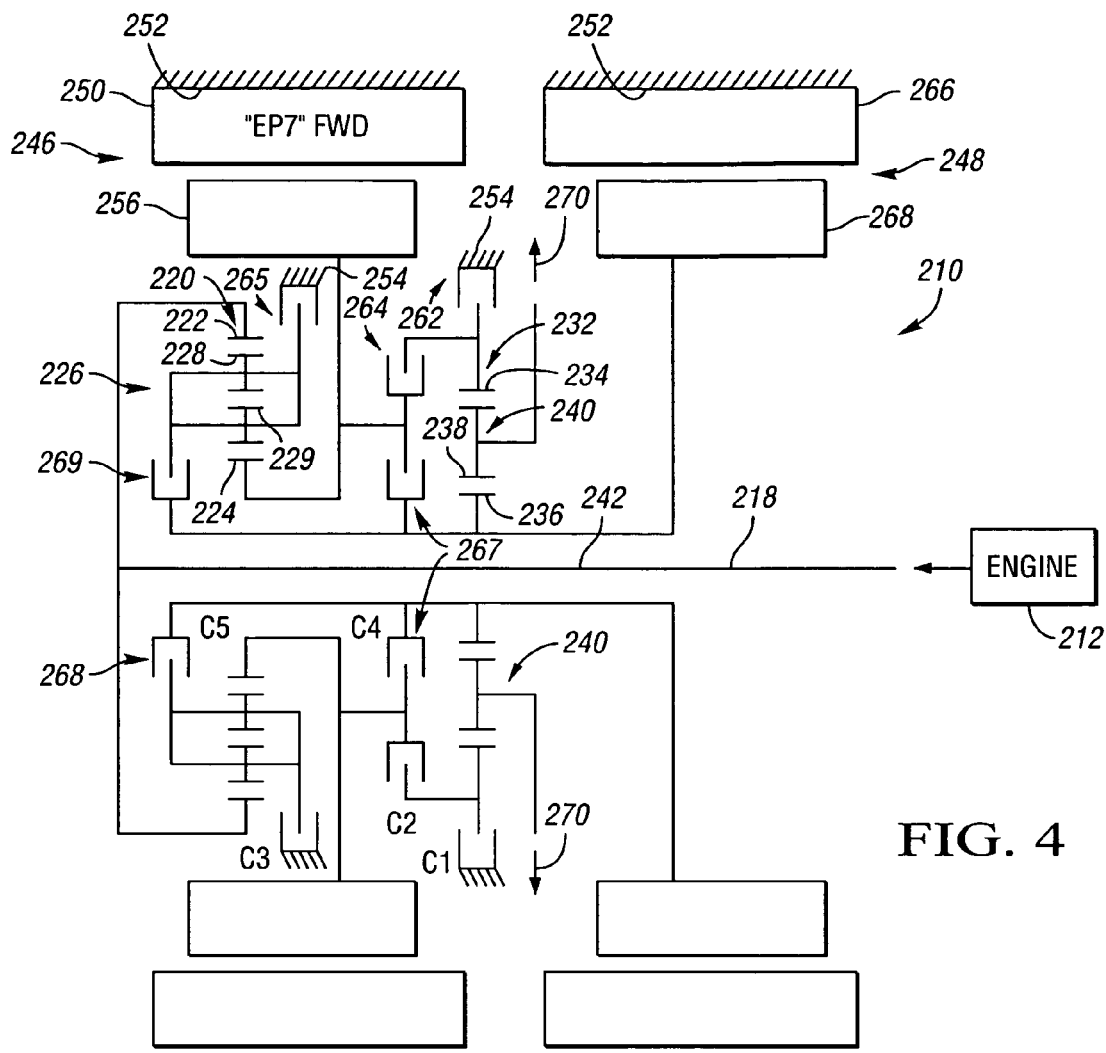
FIG. 4 is a schematic stick diagram representing one preferred form of an electrically variable transmission embodying the concepts of the present invention in a rear wheel drive transmission, wherein five torque transfer devices are implemented to provide five or six fixed ratios.
FIG. 5 is a chart illustrating clutching engagements for different operating conditions of the transmission of FIG. 4, providing six available fixed speed ratios.

The transmission 110 of FIG. 4 may, in part, receive its input power from an engine 112. In the embodiment depicted the engine 112 may also be a fossil fuel engine, such as a diesel engine which is readily adapted to provide its available power output typically delivered at a constant number of revolutions per minute (RPM). As shown, the engine 112 has an output shaft 114 that may also serve as the forward input member of a transient torque damper 116, which includes an input clutch 117. The output member of the transient torsion damper 116 serves as the input member 118 of the transmission 110.

Irrespective of the means by which the engine 112 is connected to the transmission input member 118, the transmission input member 118 is operatively connected to a planetary gear set 120 in the transmission 110.

The transmission 110 utilizes two planetary gear sets. The first is a compound planetary gear set 120 that also employs an outer gear member 122, typically designated as the ring gear. The ring gear 122 also circumscribes an inner gear member 124, typically designated as the sun gear. The carrier assembly 126, in the planetary gear set 120, however, rotatably supports two sets of planet gears 128 and 129. Each of the plurality of planet gears 129 simultaneously, and meshingly, engages the inner, sun gear 124. Each planet gear 129 meshingly engages one, and only one, adjacent planet gear 128. Each planet gear 128 simultaneously, and meshingly, engages the outer, ring gear member 122. Each planet gear 128, in turn, meshingly engages one, and only one, adjacent planet gear 129.

The input member 118 is secured to the ring gear member 122 of the compound planetary gear set 120.

The second planetary gear set 132 is a simple planetary gear set, and it has an outer gear member 134, often also designated as the ring gear, that circumscribes an inner gear member 136, also often designated as the sun gear. As is typical in a simple planetary gear set, a plurality of planet gears 138 are also rotatably mounted in a carrier 140 such that each planet gear member 138 simultaneously, and meshingly, engages both the outer, ring gear member 134 and the inner, sun gear member 136 of the second planetary gear set 132, but the pinion gear members 138 do not engage each other.

In addition, the first and second planetary gear sets 120 and 132 are mutually compounded in that the inner, sun gear 136 of the second planetary gear set 132 is conjoined, as through a central shaft 142, to the carrier assembly 126 of the compound planetary gear set 120. That is, the forward end of the central shaft 142 terminates in a radially extending flange portion 144 that is secured to the carrier assembly 126 of the compound planetary gear set 120.

The second preferred embodiment 110 also incorporates first and second motor/generators 146 and 148, respectively. The stator 150 of the first motor/generator 146 is secured to the generally annular, interior surface 152 of the transmission housing 154. The rotor 156 of the first motor/generator 146 is secured to a sleeve shaft 158. The inner, sun gear 124 of the first planetary gear set 120 is also secured to the sleeve shaft 158.

The ring gear 134 of the second planetary gear set 132 may be selectively grounded to the housing 154, as by a first torque transfer device 162 (C1). That is, the grounded ring gear 134 is selectively secured against rotation by an operative connection to the non-rotatable housing 154. The ring gear 134 of the second planetary gear set 132 is also selectively connected to the radially extending flange plate 160, as by a second torque transfer device 164 (C2). The first and second torque transfer devices 162 and 164 are employed to assist in the selection of the operational modes of the hybrid transmission 110.

The carrier 126 is selectively grounded to the transmission housing via the torque transfer device 165 (C3). Also, the carrier 126 is selectively connected to the ring gear member 122 via the torque transfer device 167 (C4).

The stator 166 of the second motor/generator 148 is also secured to the generally annular, interior surface 152 of the transmission housing 154. The rotor 168 of the second motor/generator 148 is secured to the carrier 126 of the compound planetary gear set 120.

The two planetary gear sets 120 and 132 as well as the two motor/generators 146 and 148 may be coaxially oriented, as about the axially disposed central shaft 142 and the input member 118. This configuration assures that the overall envelope—i.e., the circumferential dimension—of the transmission 110 may be minimized.

The output drive member 170 of the transmission 110 is secured to the carrier 140 of the second planetary gear set 132.

The electric power source 182 communicates with an electrical control unit (ECU) 184 by electrical transfer conductors 186A and 186B. The ECU 184 communicates with the first motor/generator 146 by electrical transfer conductors 186C and 186D, and the ECU 184 similarly communicates with the second motor/generator 148 by electrical transfer conductors 186E and 186F.

The operation of the transmission 110 is identical to that described above for transmission 10 with reference to FIG. 2.

Description of Preferred Embodiments of the Invention

Turning to FIG. 4, a transmission 210 is shown in accordance with a preferred embodiment of the invention. This transmission is functionally and structurally similar to the transmissions 10 and 110 of FIGS. 1 and 3, except that a fifth clutch is added. The fifth clutch (C5) enables the input and output to be disconnected for improved reverse gradeability and smooth engine starting and stopping. The fifth clutch also enables an output power split mode (EVT mode) and provides five or six fixed ratios (one of which may be impractical).

As shown, the transmission 210 includes an input member 218 which receives power from the engine 212 and delivers the power to the first planetary gear set 220 via the ring gear member 222.

The transmission 210 utilizes two planetary gear sets. The first is a compound planetary gear set 220 that employs the outer gear member 222, typically designated as the ring gear. The ring gear 222 also circumscribes an inner gear member 224, typically designated as the sun gear. The carrier assembly 226, in the planetary gear set 220, however, rotatably supports two sets of planet gears 228 and 229. Each of the plurality of planet gears 229 simultaneously, and meshingly, engages the inner, sun gear 224. Each planet gear 229 meshingly engages one, and only one, adjacent planet gear 228. Each planet gear 228 simultaneously, and meshingly, engages the outer, ring gear member 222. Each planet gear 228, in turn, meshingly engages one, and only one, adjacent planet gear 229.

The second planetary gear set 232 is a simple planetary gear set, and it has an outer gear member 234, often also designated as the ring gear, that circumscribes an inner gear member 236, also often designated as the sun gear. As is typical in a simple planetary gear set, a plurality of planet gears 238 are also rotatably mounted in a carrier 240 such that each planet gear member 238 simultaneously, and meshingly, engages both the outer, ring gear member 234 and the inner, sun gear member 236 of the second planetary gear set 232, but the pinion gear members 238 do not engage each other.

The transmission 210 also incorporates first and second motor/generators 246 and 248, respectively. The stator 250 of the first motor/generator 246 is secured to the generally annular, interior surface 252 of the transmission housing 254. The rotor 256 of the first motor/generator 246 is secured to the inner, sun gear 224 of the first planetary gear set 220.

The ring gear 234 of the second planetary gear set 232 may be selectively grounded to the housing 254, as by a first torque transfer device 262 (C1). That is, the grounded ring gear 234 is selectively secured against rotation by an operative connection to the non-rotatable housing 254. The ring gear 234 of the second planetary gear set 232 is also selectively connected to the sun gear member 224, as by a second torque transfer device 264 (C2). The first and second torque transfer devices 262 and 264 are employed to assist in the selection of the operational modes of the hybrid transmission 210.

The carrier 226 is selectively grounded to the transmission housing via the torque transfer device 265 (C3). Also, the sun gear member 224 is selectively connected to the sun gear member 236 via the torque transfer device 267 (C4).

A fifth torque transfer device 269 (C5) selectively connects the carrier 226 with the sun gear member 236.

The stator 266 of the second motor/generator 248 is also secured to the generally annular, interior surface 252 of the transmission housing 254. The rotor 268 of the second motor/generator 248 is secured to the sun gear member 236 of the planetary gear set 232.

The two planetary gear sets 220 and 232 as well as the two motor/generators 246 and 248 may be coaxially oriented, as about the axially disposed central shaft 242. This configuration assures that the overall envelope—i.e., the circumferential dimension—of the transmission 210 may be minimized.

The output drive member 270 of the transmission 210 is secured to the carrier 240 of the second planetary gear set 232.

The chart of FIG. 5 illustrates clutching engagements for different operating conditions of the transmission of FIG. 4. For example, in electric only mode (E1), the clutches 262 and 267 are engaged. Both motors can work to drive the vehicle forward or backwards to the limit of their combined torque and power and the battery limits, without an input or lockup clutch. In electric only mode (E2) the clutches 264 and 267 are engaged.

In series hybrid mode (S1), the clutches 262 and 265 are engaged (after a clutch-to-clutch shift between clutches 267 and 265), and power from the engine is routed through the first planetary gear set 220, into to first motor/generator 246, into the second motor/generator 248, through the second planetary gear set 232, to the output 270. The series hybrid mode (S1) may be used for engine starting and stopping.

In variable ratio mode (V1), clutches 262 and 269 are engaged to provide electrically variable ratios in an input split mode (after a shift between clutches 265 and 269).

A first fixed ratio is achieved in fixed gear (F1) with clutches 262, 267 and 269 engaged. A second fixed ratio is achieved in fixed gear (F2) with clutches 262, 264 and 269 engaged. A third fixed ratio (F3) is achieved with clutches 262, 265 and 267 engaged. The fourth fixed ratio (F4) is achieved with clutches 264, 267 and 269 engaged. The fifth fixed ratio (F5) is achieved with clutches 264, 265 and 269. The sixth fixed ratio is achieved with the engagement of the clutches 264, 265 and 267.

In variable ratio mode (V2), clutches 264 and 269 are engaged to provide electrically variable ratios in a compound split mode.

An output split range (V3) is provided with electrically variable ratios when clutches 264 and 265 are engaged, wherein the first motor/generator 246 is geared at a fixed ratio to the input and the second motor/generator 248 provides speed ratio adjustments on the second planetary gear set 232. This output split range is achieved by turning clutch 269 off, which allows engine speed to fall without a power loop, making high overdrive more efficient. It may be practical to go from this output split range to the series hybrid mode with a synchronous clutch-to-clutch shift for coastdown.

The foregoing invention provides continuously variable ratio of input speed to output speed such that it can be effectively utilized as an automotive transmission as well as a public transportation vehicle that is subjected to a wide variety of operating requirements. The engine speed can remain constant or vary independently of the vehicle speed. Shift to the selected mode of operation can be synchronous without wasted energy, so that the shifts can be instantaneous, imperceptible and without wear to the transmission components.

Description of Second Preferred Embodiment

In yet another embodiment, the transmission 210 of FIG. 4 could be modified by eliminating the clutch 265 (C3), and relocating the clutch 267 (C4) so that it selectively connects the rotor 256 with the carrier 226, while still providing input split, compound split and output split modes of operation. In this configuration, series hybrid operation (S1) is achieved with the engagement of clutches 262 (C1) and 267(C4). Variable ratio mode operation (V1) is achieved with the engagement of clutches 262 (C1) and 269(C5). A first fixed ratio is achieved in fixed gear (F1) with clutches 262, 267 and 269 engaged. A second fixed ratio is achieved in fixed gear (F2) with clutches 262, 264 and 269 engaged. A third fixed ratio is achieved in fixed gear (F3) with clutches 264, 267 and 269 engaged. In variable ratio mode (V2), clutches 264 and 269 are engaged to provide electrically variable ratios in a compound split mode. An output split range (V3) is provided with electrically variable ratios when clutches 264 and 267 are engaged.

Description of Third Preferred Embodiment

Turning to FIG. 6, a transmission 310 is shown in accordance with another preferred embodiment of the invention. This transmission is functionally and structurally similar to the transmission 210 of FIG. 4, except that the clutch 267 of FIG. 4 has been relocated.

As shown, the transmission 310 includes an input member 318 which receives power from the engine 312 and delivers the power to the first planetary gear set 320 via the ring gear member 322.

The transmission 310 utilizes two planetary gear sets. The first is a compound planetary gear set 320 that employs the outer gear member 322, typically designated as the ring gear. The ring gear 322 also circumscribes an inner gear member 324, typically designated as the sun gear. The carrier assembly 326, in the planetary gear set 320, however, rotatably supports two sets of planet gears 328 and 329. Each of the plurality of planet gears 329 simultaneously, and meshingly, engages the inner, sun gear 324. Each planet gear 329 meshingly engages one, and only one, adjacent planet gear 328. Each planet gear 328 simultaneously, and meshingly, engages the outer, ring gear member 322. Each planet gear 328, in turn, meshingly engages one, and only one, adjacent planet gear 329.

The second planetary gear set 332 is a simple planetary gear set, and it has an outer gear member 334, often also designated as the ring gear, that circumscribes an inner gear member 336, also often designated as the sun gear. As is typical in a simple planetary gear set, a plurality of planet gears 338 are also rotatably mounted in a carrier 340 such that each planet gear member 338 simultaneously, and meshingly, engages both the outer, ring gear member 334 and the inner, sun gear member 336 of the second planetary gear set 332, but the pinion gear members 338 do not engage each other.

The transmission 310 also incorporates first and second motor/generators 346 and 348, respectively. The stator 350 of the first motor/generator 246 is secured to the generally annular, interior surface 252 of the transmission housing 354. The rotor 356 of the first motor/generator 346 is secured to the inner, sun gear 324 of the first planetary gear set 320.

The ring gear 334 of the second planetary gear set 332 may be selectively grounded to the housing 354, as by a first torque transfer device 362 (C1). That is, the grounded ring gear 334 is selectively secured against rotation by an operative connection to the non-rotatable housing 354. The ring gear 334 of the second planetary gear set 332 is also selectively connected to the sun gear member 324, as by a second torque transfer device 364 (C2).

The carrier 326 is selectively grounded to the transmission housing via the torque transfer device 365 (C3). Also, the sun gear member 336 is selectively connected to the ring gear member 322 via the torque transfer device 367 (C4).

A fifth torque transfer device 369 (C5) selectively connects the carrier 326 with the sun gear member 336.

The torque transfer devices 362, 364, 365, 367 and 369 are preferably all dog clutches.

The stator 366 of the second motor/generator 348 is also secured to the generally annular, interior surface 352 of the transmission housing 354. The rotor 368 of the second motor/generator 348 is secured to the sun gear member 336 of the planetary gear set 332.

The two planetary gear sets 320 and 332 as well as the two motor/generators 346 and 348 may be coaxially oriented, as about the axially disposed central shaft 342. This configuration assures that the overall envelope—i.e., the circumferential dimension—of the transmission 310 may be minimized.

The output drive member 370 of the transmission 310 is secured to the carrier 340 of the second planetary gear set 332.

Figure 7:
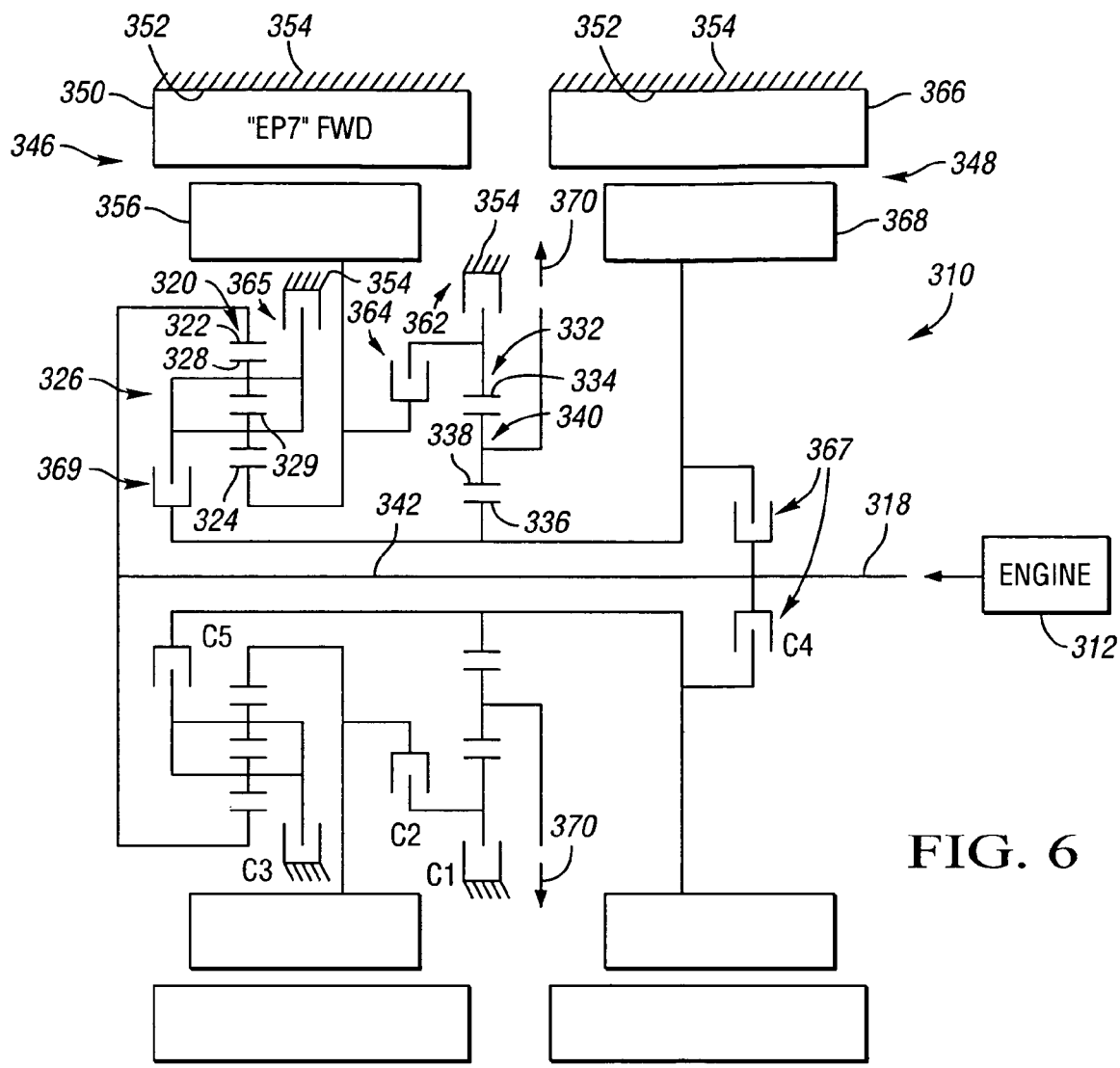
FIG. 7 is a chart illustrating clutching engagements for different operating conditions of the transmission of FIG. 6, providing five fixed speed ratios.

The chart of FIG. 7 illustrates clutching engagements for different operating conditions of the transmission of FIG. 6. These torque transfer device engagements are similar to those described above with reference to FIG. 5, except the fixed ratio engagements have changed and the ratios E1, E2 and F6 have been removed.

As shown in FIG. 7, a first fixed ratio is achieved in fixed gear (F1) with clutches 362, 367 and 369 engaged. A second fixed ratio is achieved in fixed gear (F2) with clutches 362, 364 and 369 engaged. A third fixed ratio (F3) is achieved with clutches 364, 367 and 369 engaged. The fourth fixed ratio (F4) is achieved with clutches 364, 365 and 369 engaged. The fifth fixed ratio (F5) is achieved with clutches 364, 365 and 367.

The rest of the operating modes are the same as those described above with reference to FIG. 5. The third EVT range (V3), an output-split top range, allows the input-split and compound split ranges to be compressed, limiting the amount of power used by the electric motor/generators 346, 348 without using fixed ratio operation. The fixed ratio operation provides improved fuel economy, especially in F4 and F5 (overdrive). Series operation is provided for reverse and for engine starting and stopping. Either C3 (365) or C5 (369) would be normally engaged to allow cold starting.

Description of Fourth Preferred Embodiment

Figures 8, 9:
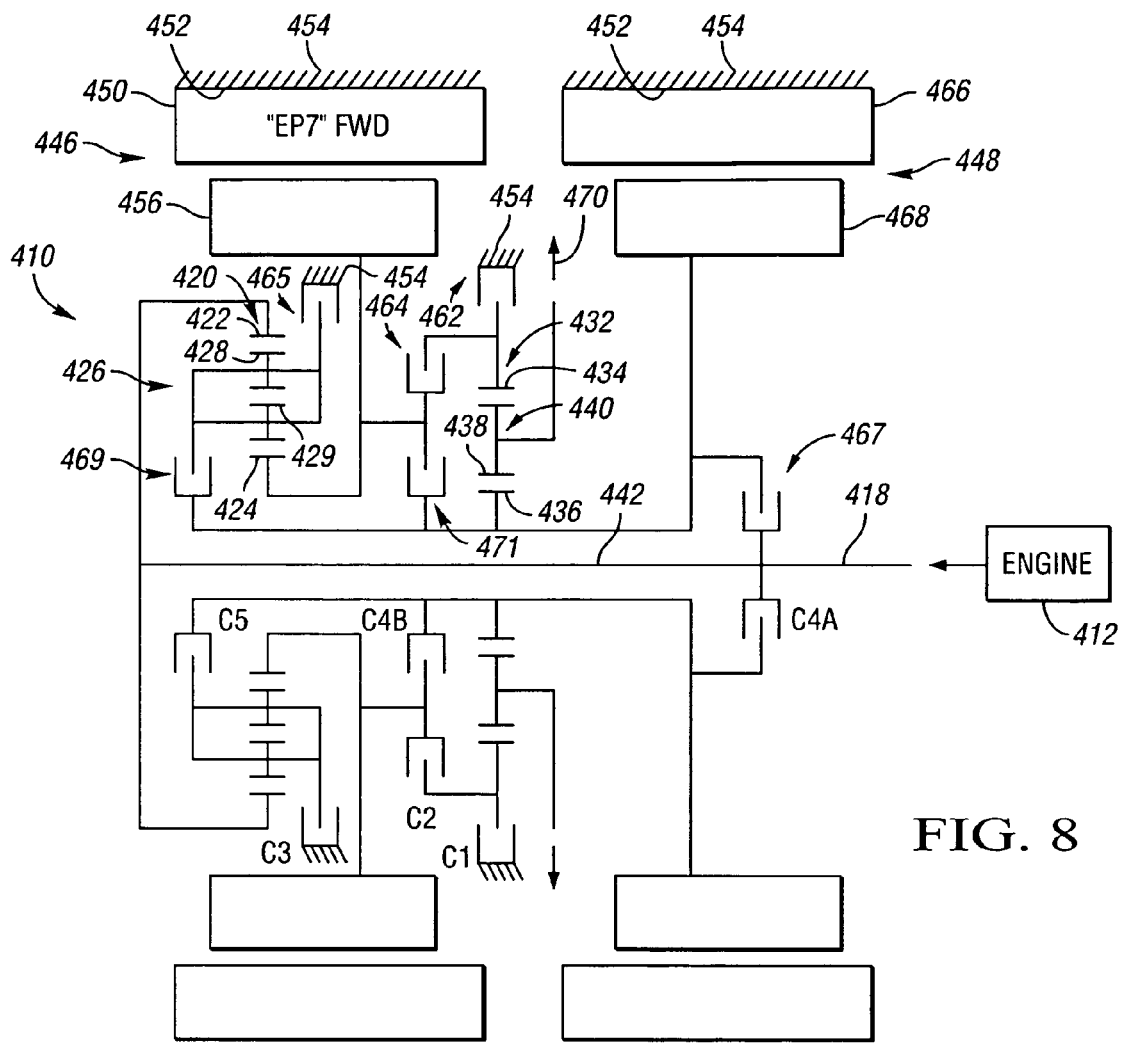
FIG. 8 is a schematic stick diagram representing another embodiment of the invention, providing a three-range input-compound-output split electrically variable transmission with six single-transition fixed speed ratios.
FIG. 9 is a chart illustrating clutching engagements for different operating conditions of the transmission of FIG. 8, providing six fixed speed ratios.

Turning to FIG. 8, a transmission 410 is shown in accordance with another preferred embodiment of the invention. This transmission is functionally and structurally similar to the transmission 310 of FIG. 6, except that the clutch 469 has been added.

As shown, the transmission 410 includes an input member 418 which receives power from the engine 412 and delivers the power to the first planetary gear set 420 via the ring gear member 422.

The transmission 410 utilizes two planetary gear sets. The first is a compound planetary gear set 420 that employs the outer gear member 422, typically designated as the ring gear. The ring gear 422 also circumscribes an inner gear member 424, typically designated as the sun gear. The carrier assembly 426, in the planetary gear set 420, however, rotatably supports two sets of planet gears 328 and 329. Each of the plurality of planet gears 429 simultaneously, and meshingly, engages the inner, sun gear 324. Each planet gear 329 meshingly engages one, and only one, adjacent planet gear 428. Each planet gear 428 simultaneously, and meshingly, engages the outer, ring gear member 422. Each planet gear 428, in turn, meshingly engages one, and only one, adjacent planet gear 429.

The second planetary gear set 432 is a simple planetary gear set, and it has an outer gear member 434, often also designated as the ring gear, that circumscribes an inner gear member 436, also often designated as the sun gear. As is typical in a simple planetary gear set, a plurality of planet gears 438 are also rotatably mounted in a carrier 440 such that each planet gear member 438 simultaneously, and meshingly, engages both the outer, ring gear member 434 and the inner, sun gear member 436 of the second planetary gear set 432, but the pinion gear members 438 do not engage each other.

The transmission 410 also incorporates first and second motor/generators 446 and 448, respectively. The stator 450 of the first motor/generator 446 is secured to the generally annular, interior surface 452 of the transmission housing 454. The rotor 456 of the first motor/generator 446 is secured to the inner, sun gear 424 of the first planetary gear set 420.

The ring gear 434 of the second planetary gear set 432 may be selectively grounded to the housing 454, as by a first torque transfer device 462 (C1). That is, the grounded ring gear 434 is selectively secured against rotation by an operative connection to the non-rotatable housing 454. The ring gear 434 of the second planetary gear set 432 is also selectively connected to the sun gear member 424, as by a second torque transfer device 464 (C2).

The carrier 426 is selectively grounded to the transmission housing via the torque transfer device 465 (C3). Also, the sun gear member 436 is selectively connected to the ring gear member 422 via the torque transfer device 467 (C4A).

A fifth torque transfer device 469 (C5) selectively connects the carrier 426 with the sun gear member 436. A sixth torque transfer device 471 (C4B) selectively connects the sun gear member 424 with the sun gear member 436.

The torque transfer devices 462, 464, 465, 467, 469 and 471 are preferably all dog clutches.

The stator 466 of the second motor/generator 448 is also secured to the generally annular, interior surface 452 of the transmission housing 454. The rotor 468 of the second motor/generator 448 is secured to the sun gear member 436 of the planetary gear set 432.

The two planetary gear sets 420 and 432 as well as the two motor/generators 446 and 448 may be coaxially oriented, as about the axially disposed central shaft 442. This configuration assures that the overall envelope—i.e., the circumferential dimension—of the transmission 410 may be minimized.

The output drive member 470 of the transmission 410 is secured to the carrier 440 of the second planetary gear set 432.

The chart of FIG. 9 illustrates clutching engagements for different operating conditions of the transmission of FIG. 8. These torque transfer device engagements are similar to those described above with reference to FIG. 7, except the sixth fixed ratio (F6) has been added. In the sixth fixed ratio (F6), the clutches 464, 465 and 469 are engaged. All of the fixed ratio shifts are single-transition shifts.

A seventh fixed ratio is available in this design, but it requires double-transition shifts and is therefore impractical.

Conclusion

Each embodiment of the invention provides electrically variable transmission, including an input member to receive power from an engine; an output member; first and second planetary gear sets each having first, second and third gear members; first and second electric motor/generators connected to members of the planetary gear sets; and at least five selective torque transfer devices also connected to members of the planetary gear sets. The torque transfer devices are selectively engageable in combinations of two or three to provide five or six available fixed speed ratios, and, sequentially, an input-split mode, a compound-split mode, and an output-split mode, as output speed of the transmission increases.

While only four preferred embodiments of the present invention are disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

In the claims, the language "continuously connected" refers to a direct connection or a proportionally geared connection, such as gearing to an offset axis.

The invention claimed is:

1. An electrically variable transmission, comprising:
an input member to receive power from an engine;
an output member;
first and second planetary gear sets each having first, second and third gear members;
first and second electric motor/generators connected to members of said planetary gear sets;
five selective torque transfer devices also connected to members of said planetary gear sets;
wherein said torque transfer devices are selectively engageable in combinations of two or three to provide, sequentially, an input-split mode, a compound-split mode, and an output-split mode, as output speed of the transmission increases, and to provide six available fixed speed ratios.

2. An electrically variable transmission comprising:
an input member to receive power from an engine;
an output member;
first and second motor/generators;
first and second planetary gear sets each having first, second and third gear members;
said input member being continuously connected to said first member of said first planetary gear set, and said output member being continuously connected to said first member of said second planetary gear set;
said first motor/generator being continuously connected to said second member of said first planetary gear set;
said second motor/generator being continuously connected with said third member of said second planetary gear set;
a first torque transfer device selectively grounding said second member of said second planetary gear set;
a second torque transfer device selectively connecting said second member of said second planetary gear set to said second member of said first planetary gear set;
a third torque transfer device selectively grounding said third member of said first planetary gear set;
a fourth torque transfer device selectively connecting said first or second member of said first planetary gear set with said third member of said second planetary gear set; and a fifth torque transfer device selectively connecting said third member of said first planetary gear set with said third member of said second planetary gear set;

wherein said torque transfer devices are selectively engageable in combinations of two or three to provide at least five available fixed speed ratios.

3. The electrically variable transmission of claim 2, wherein said first, second and third members of said first planetary gear set comprise a ring gear, sun gear and carrier, respectively, and said first, second and third members of said second planetary gear set comprise a carrier, ring gear and sun gear, respectively.

4. The electrically variable transmission of claim 3, wherein said first planetary gear set is a compound planetary gear set, and said second planetary gear set is a simple planetary gear set.

5. The electrically variable transmission of claim 2, wherein a first fixed speed ratio is achieved with the engagement of said first, fourth and fifth torque transfer devices; a second fixed speed ratio is achieved with the engagement of said first, second and fifth torque transfer devices; a third fixed speed ratio is achieved with the engagement of said first, third and fourth torque transfer devices; a fourth fixed speed ratio is achieved with the engagement of said second, fourth and fifth torque transfer devices; a fifth fixed speed ratio is achieved with the engagement of said second, third and fifth torque transfer devices; and a sixth fixed speed ratio is achieved with the engagement of said second, third and fourth torque transfer devices.

6. The electrically variable transmission of claim 2, wherein a first fixed speed ratio is achieved with the engagement of said first, fourth and fifth torque transfer devices; a second fixed speed ratio is achieved with the engagement of said first, second and fifth torque transfer devices; a third fixed speed ratio is achieved with the engagement of said second, fourth and fifth torque transfer devices; a fourth fixed speed ratio is achieved with the engagement of said second, third and fifth torque transfer devices; and a fifth fixed speed ratio is achieved with the engagement of said second, third and fourth torque transfer devices.

7. The electrically variable transmission of claim 2, wherein a first fixed speed ratio is achieved with the engagement of said first, fourth and fifth torque transfer devices; a second fixed speed ratio is achieved with the engagement of said first, second and fifth torque transfer devices; a third fixed speed ratio is achieved with the engagement of said second, fourth and fifth torque transfer devices; a fourth fixed speed ratio is achieved with the engagement of said second, third and fifth torque transfer devices; a fifth fixed speed ratio is achieved with the engagement of said second, third and fourth torque transfer devices; and a sixth fixed speed ratio is achieved with the engagement of said second, third and sixth torque transfer devices.

8. An electrically variable transmission comprising:
    an input member to receive power from an engine;
    an output member;
    first and second motor/generators;
    first and second planetary gear sets each having first, second and third gear members;
    said input member being continuously connected to said first member of said first planetary gear set, and said output member being continuously connected to said first member of said second planetary gear set;
    said first motor/generator being continuously connected to said second member of said first planetary gear set;
    said second motor/generator being continuously connected with said third member of said second planetary gear set;
    a first torque transfer device selectively grounding said second member of said second planetary gear set;
    a second torque transfer device selectively connecting said second member of said second planetary gear set to said second member of said first planetary gear set;
    a third torque transfer device selectively grounding said third member of said first planetary gear set;
    a fourth torque transfer device selectively connecting said second member of said first planetary gear set with said third member of said second planetary gear set; and
    a fifth torque transfer device selectively connecting said third member of said first planetary gear set with said third member of said second planetary gear set;
    wherein said torque transfer devices are selectively engageable in combinations of two or three to provide six available fixed speed ratios.

9. The electrically variable transmission of claim 8, wherein said first, second and third members of said first planetary gear set comprise a ring gear, sun gear and carrier, respectively, and said first, second and third members of said second planetary gear set comprise a carrier, ring gear and sun gear, respectively.

10. The electrically variable transmission of claim 8, wherein said first planetary gear set is a compound planetary gear set, and said second planetary gear set is a simple planetary gear set.

11. The electrically variable transmission of claim 8, wherein a first fixed speed ratio is achieved with the engagement of said first, fourth and fifth torque transfer devices; a second fixed speed ratio is achieved with the engagement of said first, second and fifth torque transfer devices; a third fixed speed ratio is achieved with the engagement of said first, third and fourth torque transfer devices; a fourth fixed speed ratio is achieved with the engagement of said second, fourth and fifth torque transfer devices; a fifth fixed speed ratio is achieved with the engagement of said second, third and fifth torque transfer devices; and a sixth fixed speed ratio is achieved with the engagement of said second, third and fourth torque transfer devices.

12. The electrically variable transmission of claim 8, wherein a first fixed speed ratio is achieved with the engagement of said first, fourth and fifth torque transfer devices; a second fixed speed ratio is achieved with the engagement of said first, second and fifth torque transfer devices; a third fixed speed ratio is achieved with the engagement of said second, fourth and fifth torque transfer devices; a fourth fixed speed ratio is achieved with the engagement of said second, third and fifth torque transfer devices; a fifth fixed speed ratio is achieved with the engagement of said second, third and fourth torque transfer devices; and a sixth fixed speed ratio is achieved with the engagement of said second, third and sixth torque transfer devices.

13. The electrically variable transmission of claim 8, further comprising a sixth torque transfer device selectively connecting said third member of said second planetary gear set with said first member of said first planetary gear set.

* * * * *